United States Patent [19]

Janes et al.

[11] 4,038,549

[45] July 26, 1977

[54] ISOTOPICALLY SELECTIVE EXCITATION FROM PLURAL EXCITED STATES

[75] Inventors: George Sargent Janes, Lincoln, Mass.; Richard H. Levy, Seattle, Wash.

[73] Assignee: Jersey Nuclear-Avco Isotopes, Inc., Bellevue, Wash.

[21] Appl. No.: 368,298

[22] Filed: June 8, 1973

[51] Int. Cl.² .................... H01J 37/08; H01J 39/34
[52] U.S. Cl. .......................... 250/423 P; 250/284; 250/296
[58] Field of Search ............... 250/423, 424, 425, 281, 250/282, 283, 284, 296

[56] References Cited

U.S. PATENT DOCUMENTS

| | | | |
|---|---|---|---|
| 3,443,087 | 5/1969 | Robieux | 250/424 |
| 3,740,552 | 6/1973 | Pressman | 250/424 |

*Primary Examiner*—Craig E. Church
*Attorney, Agent, or Firm*—Weingarten, Maxham & Schurgin

[57] ABSTRACT

In a technique for isotope enrichment a system for selectively exciting increased amounts of one isotope type in an environment of plural isotope types by the application of excitation energy at a plurality of frequencies which selectively excite the one isotope from its ground energy level and one or more typically low-lying excited levels.

29 Claims, 4 Drawing Figures

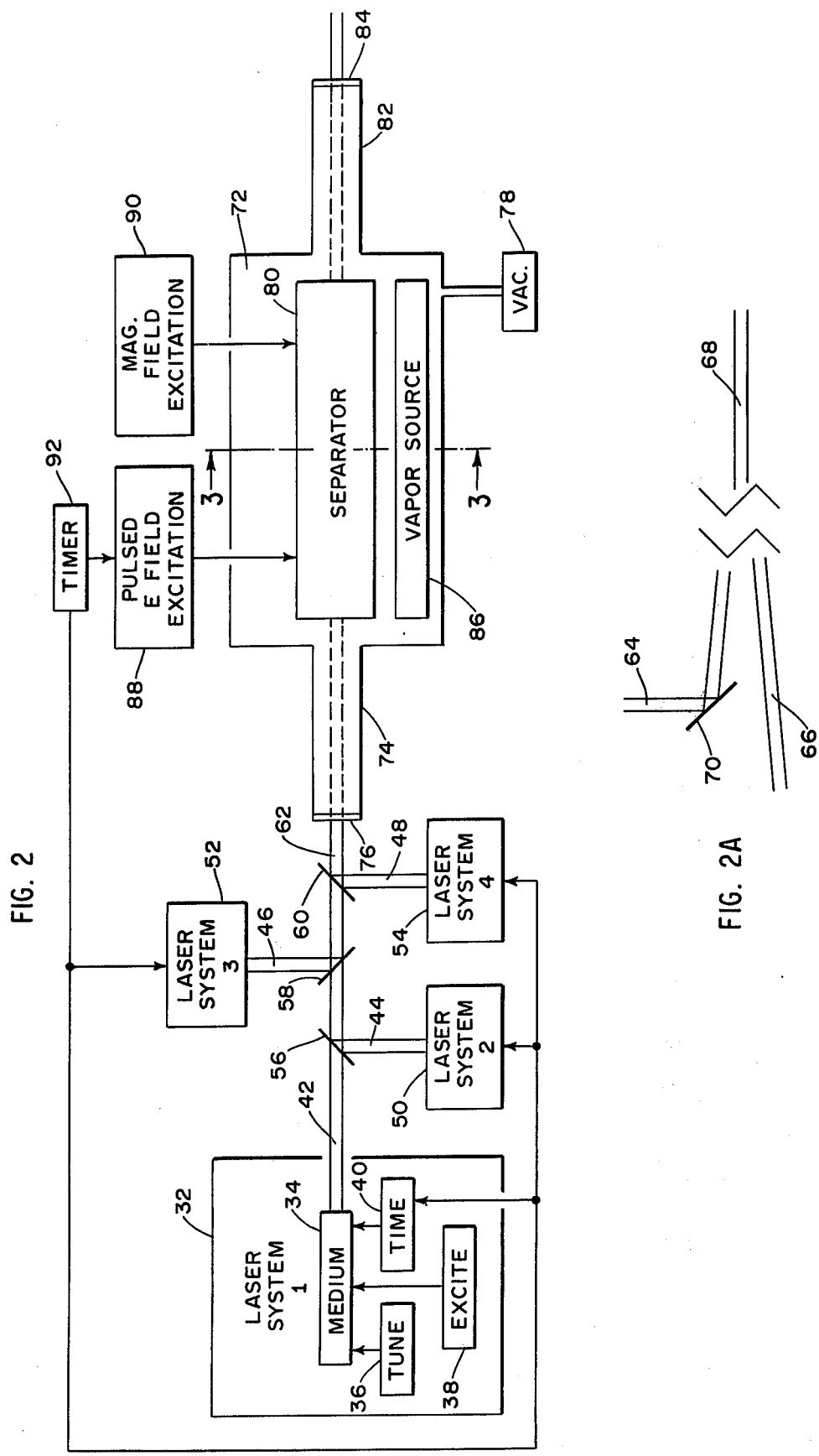

ISOTOPICALLY SELECTIVE EXCITATION FROM PLURAL EXCITED STATES

FIELD OF THE INVENTION

This invention relates to isotope separation and in particular to an improved method and apparatus for isotope separation by selective excitation from generally low-lying excited states.

BACKGROUND OF THE INVENTION

Nearly all fission reactions with the uranium $U_{235}$ isotope operate with a greater concentration of that isotope than is typically found in the natural or depleted condition of the uranium element. Enrichment processes are typically employed to increase the proportion of the fissionable $U_{235}$ isotope to the other isotopes in uranium, primarily $U_{238}$. Enrichment is typically achieved through separation processes which operate on the slight chemical or physical difference between the $U_{235}$ and the $U_{238}$ isotope. Because these differences are slight, the enrichment which is achieved through a single separation step is typically very slight, and accordingly the separation step is repeated many times in cascaded sequence to ultimately achieve the necessary enrichment.

As shown in our U.S. Pat. now Pat. No. 3,772,519, incorporated herein by reference, a promising new technique for isotope separation and particularly for uranium enrichment operates by selective excitation of energy states of one uranium isotope in an environment containing plural uranium isotopes. In typical application, a uranium vapor is created and illuminated with laser radiant energy having photon energies which selectively excite and ultimately ionize the $U_{235}$ isotope without corresponding excitation and ionization of other uranium isotopes, chiefly $U_{238}$. In achieving a significantly increased proportion of the $U_{235}$ isotope in the ionized state than in the non-ionized state the laser radiation, and, in particular, the radiation which achieves the first excitation of $U_{235}$ particles, is chosen to have a very narrow range of photon energies which corresponds to a $U_{235}$ absorption line, but not a $U_{238}$ absorption line. It is, therefore, possible to excite a substantial quantity of the $U_{235}$ isotope in the uranium vapor without exciting the $U_{238}$ isotope.

The excited and ultimately ionized $U_{235}$ isotope is then typically accelerated out of the uranium vapor by the application of energy in one of several forms to the ions causing them to assume trajectories which will carry them toward collecting plates. The un-ionized uranium in the uranium vapor, consisting chiefly of $U_{238}$ and whatever $U_{235}$ has not been ionized and collected, continues on its normal path towards a further collecting surface.

Efficient separation and collection of the $U_{235}$ isotope requires that in the initial excitation step all, or nearly all, of the $U_{235}$ isotope in the uranium vapor is excited to an intermediate energy state. Such high efficiency further demands that an excitation radiation frequency be selected which will elevate $U_{235}$ particles in energy from a beginning energy state to a second real energy state. The actual radiation frequency is defined by the difference in energy between those two states. For this, the initial state for those particles must be known.

One may assume that substantial numbers of the particles exist in the ground state and accordingly selectively excite those particles to an intermediate level using a corresponding laser frequency. However, as has been discovered, characteristics of the enrichment process result in significant populations of the $U_{235}$ isotope in the uranium vapor at energy levels other than the ground or zero energy level. The excitation radiation will then, in general, be ineffective to excite that population of the $U_{235}$ isotope which is not in the ground state, and accordingly it will not be separated along with the $U_{235}$ particles originally in the ground state.

The presence of a significant population of $U_{235}$ particles above the ground energy state, before application of the excitation radiation, may be explained as resulting from a random or particular distribution of energy in the uranium vapor. The existence of this energy in the uranium vapor may be attributable to the substantial quantities of thermal energy imparted to the uranium to vaporize it and to maintain its gaseous state, to particle collisions including interaction with energy beams, or other phenomena which result from the particular environment created in the application of selective excitation to produce enrichment.

BRIEF SUMMARY OF THE INVENTION

In accordance with the use of the present invention in isotope enrichment, particles of one isotope type in an environment of plural isotope types are selectively excited or ionized from typically both the ground energy level and significantly populated other energy levels, which may be thermally or otherwise generated, by application of excitation energy at generally plural frequencies corresponding to discrete energy jumps for the one isotope from its ground and excited states to at least one intermedite energy level. Enrichment is typically completed by subsequent photo-ionization, electromagnetic separation and finally collection of the separated isotope in enriched proportions.

In the specific context of an enrichment technique with which the present invention may be advantageously employed, a vapor flow is generated of a material having plural isotopes. At least one isotope is to be separated and collected. Radiant energy in the form of radiations from a plurality of lasers is applied to the vapor flow to produce ionization of the one isotope without corresponding ionization of the other of the plural isotopes in the environment. Typically, one frequency in the radiant energy will be selected to correspond to a specific energy jump or transition for the one isotope from its ground energy state to an intermediate energy state. One or more laser radiations in the applied radiant energy are also tuned to correspond to specific energy jumps for the one isotope from one or more generally low-lying excited energy states for that isotope to an intermediate energy level. The intermediate energy levels for the particles selectively excited from the ground energy level and other energy levels may be the same where those transitions are allowed.

The excited energy levels from which further particles of the one isotope are selectively excited to an intermediate energy level are typically those which are known, estimated or measured to have significant populations of particles of the one isotope and will normally be the first, second, etc. thermal levels above the ground state but may include other levels populated by specific energy exchange interactions.

To complete the enrichment system in the preferred embodiment, particles excited to the one or more intermediate levels are ionized by the interaction of one or more photons of additional radiant energy on each excited particle. The particles of the one isotope thus ionized may be electromagnetically separated for collection apart from the remaining components of the vapor flow by using cross-field MHD accelerator techniques.

DETAILED DESCRIPTION OF THE DRAWINGS

These and other features of the present invention will be fully understood by reference to the following detailed description of a preferred embodiment and to the accompanying drawings of which:

FIG. 2 is a pictorial view of apparatus for achieving excitation and separation according to the present invention;

FIG. 2A is a modification of a portion of the apparatus of FIG. 2; and

DETAILED DESCRIPTION OF THE PREFERRED EMBODIMENT

The present invention contemplates an efficient method and apparatus for photoexcitation or ionization of particles of one isotope type in an environment of particles of several isotope types by producing plural transitions for the one isotope from significantly populated plural energy states.

In specific application, the present invention is useful for the enrichment of the $U_{235}$ isotope of uranium from naturally occurring or depleted uranium sources. It is contemplated that other isotopes and elements may be employed and that the particles which are photoionized may be in the atomic or molecular form or compounded with other elements. A few definitions should also be noted. The term radiant energy is intended to include one or more frequencies of radiation, however achieved. The term transition is used to convey the possibility of one or more energy steps, typically employed in achieving excitation or ionization.

Figure 1:
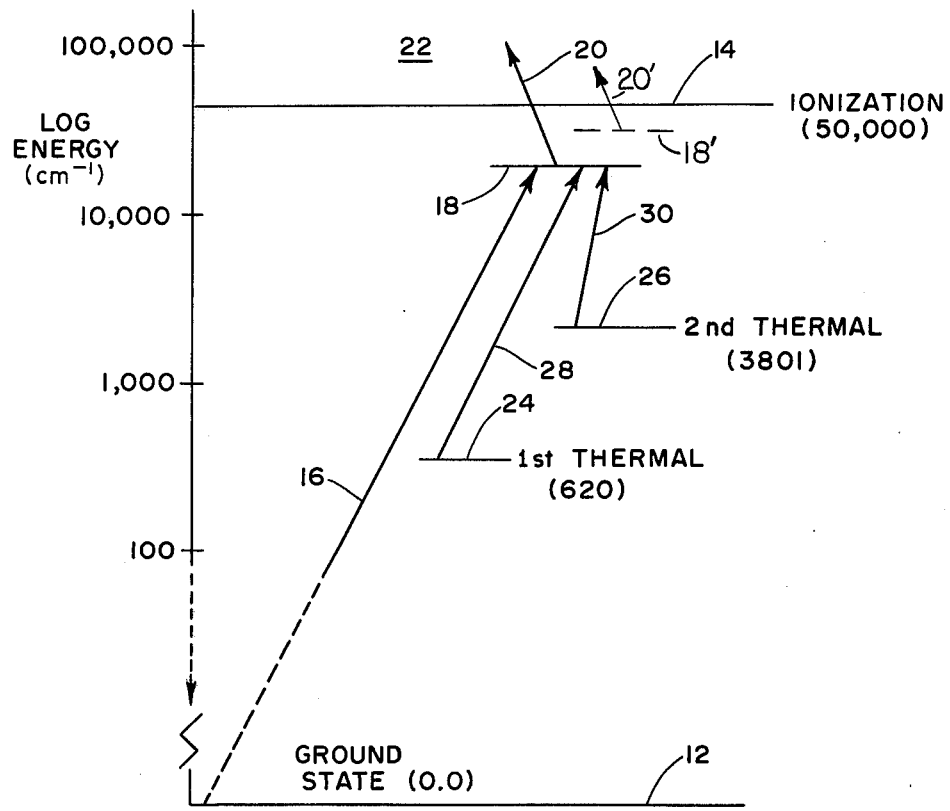
FIG. 1 is an energy level diagram useful in illustrating the processes associated with the present invention.

By reference now to FIG. 1, the details of the present invention may be set forth. In particular, there is shown in FIG. 1, on a modified logarithmic scale, exemplary energy steps which may be employed in achieving photoionization according to the present invention. A ground energy level 12 is indicated and is generally defined as the zero energy level. An ionization level 14 is also shown which, for the exemplary case of uranium, may be taken at the energy level of approximately 50,000 wave numbers, or approximately 6.2 ev. The wave number designation is a commonly applied measure of energy and corresponds to the number of wave lengths within a centimeter. From the ground level 12, a first energy step 16 or transition is produced according to the invention by finely tuned laser radiation which selectively excites particles of the $U_{235}$ isotope of uranium without producing corresponding excitation of particles of the $U_{238}$ or other isotope types. An intermediate energy level 18 below the ionization level 14 is reached by the transition 16. From energy level 18, a second transition 20 is produced by further radiant energy to put the excited particles above the ionization level into the region 22. In typical implementation, the transition 16 may be achieved with a single frequency of laser radiation and thus will not include intermediate levels. The transition 20 may be similarly produced but is not necessarily so limited.

It has been determined that significant populations of the $U_{235}$ isotope are distributed at energy levels other than the ground state 12 as typically represented by first and second levels 24 and 26 which have been determined to have energy levels corresponding to approximately 620 and 3,801 wave numbers. From these thermally excited energy states 24 and 26, respective transitions 28 and 30 are produced by corresponding frequencies of laser radiation to the intermedite level 18 or a further level 18' where the transition to level 18 is not allowed. All excited isotopes at the level 18 or 18' may then be raised to above the ionization level in the transition 20 or 20' where level 18' is used. The ions resulting from the photoionization transition 20 or 20' are separated and collected to provide quantities of the enriched uranium.

It is to be noted that the specific example shown in FIG. 1 is typical only and that one may indeed excite from more than the first and second thermally excited states, or in fact from other levels than those most directly above the ground state 12 or other than ground state 12. Additionally, where intermediate level or levels 18 are used, it may be possible for fewer frequencies to be employed to excite from more than one low-lying level to more than one intermediate level without permitting corresponding excitation of particles other than those of the $U_{235}$ isotope. Finally, it is to be noted that the values given in FIG. 1 are exemplary only and in the case of uranium exact numbers can be found in the literature. In particular, LA 4501 *Present Status of the Analyses of the First and Second Spectral of Uranium (UI and UII) as Derived from Measurements of Optical Spectra;* Los Alamos Scientific Laboratory of the University of California, available from National Technical Information Service, U.S. Department of Commerce, 5285 Port Royal Road, Springfield, Va.

In implementing the process of the present invention illustrated with respect to FIG. 1, the apparatus shown in FIG. 2 may typically be employed. As shown there, a first laser system 32 includes a lasing medium 34 which is typically a lasing dye solution to provide substantially continuous tunability over a range of laser radiation frequencies so that the desired frequency for use in the invention may be employed. Dyes for this purpose are well known in the art. The lasing medium 34 is tuned to a specific frequency in its possible lasing range of efficient frequencies by a tuning system 36. Tuning system 36 may include an etalon filter where desired to limit the frequency spread to an appropriately narrow bandwidth. An excitation system 38 which may include an additional laser or light energy source is provided to generate the laser pumping energy for producing a population inversion and ultimate lasing of the medium 34. A timing system 40 is shown to provide initiation of a pulse of laser radiation 42 from the medium 34. The lasing system 32 may typically be one of the "Dial-A-Line" lasers of the Avco Everett Research Laboratory, Everett, Massachusetts. The beam 42 is joined with second, third and fourth laser beams 44, 46 and 48 from respective laser systems 50, 52 and 54 through dichroic mirrors 56, 58 and 60 respectively, to provide a composite beam 62 of radiant energy having the four laser radiations contained therein.

Typically, the laser system 32 is tuned to provide the transition 16, while the systems 50, 52 and 54 are tuned respectively for producing the transitions 28, 30 and 20.

A greater or lesser number of laser systems may be employed as is found necessary in view of the specific energy steps produced. Additionally, one or more stages of amplification may be included within the laser systems as is found desirable in practicing the invention.

Where it is found undesirable to combine any of the two separate laser radiations with a dichroic mirror as shown in FIG. 2, the modification illustrated in FIG. 2A may be employed. As shown there, first and second laser radiations 64 and 66 are provided and it is desired to combine them into a single composite beam 68. This may conveniently be achieved by reflecting beam 64 with a mirror 70 onto a path which is nearly parallel to beam 66 but slightly convergent so that after a predetermined distance the composite beam 68 is achieved. Alternatively, the combining may be achieved directly by a prism.

Returning to FIG. 2 and the apparatus of the present invention, the beam 62 is applied to a chamber 72 through a long pipe 74 having a transmissive window 76 thereon for the radiation in beam 62. Window 76 may be optical quartz and pipe 74 reduces vapor deposits on window 76. The chamber 72 is evacuated through a pump system 78 to maintain a low pressure within the chamber 72 such that the interference of atmospheric components with the process of the invention such as from particle collisions, combustion of the uranium vapor or other mechanisms is minimized. The beam 62 travels through a separator 80 and exits from the chamber 72 through a further pipe 82 and substantially transparent window 84 where it may be applied to one or more additional chambers similar to the chamber 72 for further use of the energy in beam 62.

Uranium vapor is generated within the chamber 72 by a vapor source 86 and is generally directed into the separator 80 where radiant energy in the beam 62 is applied to selectively ionize the $U_{235}$ particles of the uranium vapor. The selectively ionized particles are then accelerated by a typically crossed-field MHD accelerator employing a pulsed electric field and continuous magnetic field from electric field excitation source 88 and a magnetic field excitation source 90, respectively.

A timer system 92 typically provides simultaneous activation of timer systems 40 within all four laser systems 32, 50, 52 and 54 and additionally activates the pulsed electric field excitation source 88 to provide a short duration electric field pulse directly subsequent to each pulse of radiant energy from the laser systems.

Figure 3:
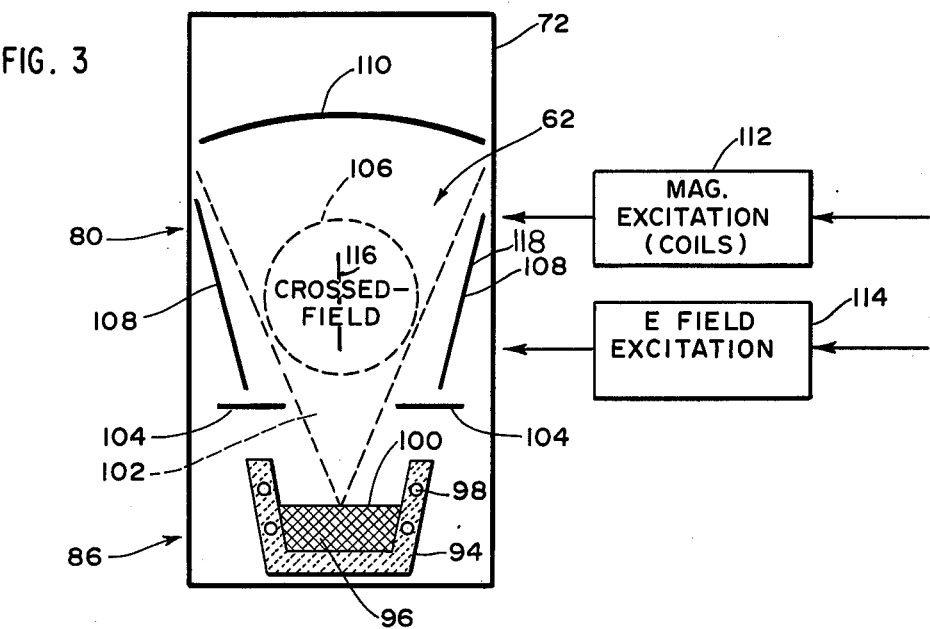
FIG. 3 is an internal, sectional view of a portion of the apparatus of FIG. 2.

Further details of the separator 80 and vapor source 86 within the chamber 72 may be seen by reference to FIG. 3, showing a pictorial view of a section of the chamber 72 along lines indicated in FIG. 2. Within the chamber 72 the vapor source 86 may typically comprise a crucible 94 having therein a supply of elemental uranium 96 and cooled by a fluid in conduits 98. The uranium 96 may be evaporated by heating, through furnace or induction means, or by the application of an energy beam as, for example, an electron beam to its exposed surface 100. By application of this energy, a uranium vapor is generated to provide an expanding vapor flow 102 directed towards the separator 80 through collimator slits 104 if desired. The vapor flow 102 will have some excited $U_{235}$ due to thermal excitation, particle collisions, interactions with the electron beam or otherwise.

The vapor flow 102 enters into the separator 80 and into at least one region 106 which is generally coextensive with the area of illumination by the radiant energy in the beam 62. After application of the radiant energy, ions of the desired $U_{235}$ isotope are created within the region 106 and these may be subsequently attracted to either of the side plates 108 by pulsed application of a crossed-field MHD acceleration force within the region 106. That portion of the vapor not diverted continues on to a collection plate 110.

The crossed-field may be provided by magnetic excitation coils 112 to produce a magnetic field parallel to the laser beam 62 and electric field excitation source 88 to electrodes 114 which can be placed in any of several configurations such as 116 and 118 to provide orthogonal electric and magnetic fields within the region 106, typically so adjusted as to drive the ions toward one of the plates 108.

The radiant energy in the beam 62 will typically be provided in periodic pulses, adjusted in repetition rate to insure that all portions of the vapor flow 102 are illuminated during one pulse in the beam 62. The duration of the laser pulse, which is normally determined by the properties of the medium 34 as known in the art, may typically be a substantial fraction of a microsecond. Directly subsequent to the application of each laser pulse in beam 62, the electric field is applied by the pulsed electric field excitation source 88 to provide, in interaction with the continuously applied magnetic field, a crossed-field in at least the region 106. The crossed-field is adjusted to accelerate the ions on trajectories distinct from their direction within the vapor flow 102 and preferably towards one of the collection plates 108 at the side of the separator. The pulse of electric field is typically in the range of less than 2 microseconds, since it is preferable to terminate the acceleration forces before substantial charge exchange reactions occur with the $U_{235}$ ions. This inhibits acceleration of $U_{238}$ particles which have acquired an electric charge before the accelerating forces are terminated. Similarly, the dimensions between the plates 108 and other structures within the chamber 72 are typically limited in size by the kinetic mean free path for particles in the vapor flow 102, such that significant or substantial particle collisions do not occur to divert either the non-ionized components of the vapor flow 102 or the ionized and accelerated particles of the desired $U_{235}$ isotope.

While selective ionization has been described as comprising an excitation and separate ionization energy step, it is contemplated that auto-ionization processes typically employing only one energy step are operable within the scope of the invention.

Having described above a preferred embodiment for the present invention, it will occur to those skilled in the art that alternatives and modifications to the disclosed structure exist within the spirit of the invention. Accordingly, it is intended to limit the scope of the invention only as indicated in the following claims.

What is claimed is:

1. In a system for isotope separation a process for selectively producing transitions in particles of one first isotope type in an environment of a material having plural isotopes in which the plural isotopes populate plural, low-lying energy states to substantial degrees, said process including the steps of:
producing a first transition in the particles of said first isotope type in said environment from a first one of the substantially populated low-lying energy states to a substantially higher energy condition therefor;

controlling said transition to selectively produce the first transition in said particles of said first isotope type without corresponding excitation of the other particles of said environment;

producing a second transition in further particles of said environment from one or more other ones of the substantially populated, low-lying energy states to a higher energy condition therefore; and controlling said second transition to selectively produce said second transition in the particles of the first isotope type in said one or more other populated states to the substantially higher energy conditions without correspondingly exciting other isotope type particles of said environment.

2. The process of claim 1 wherein:
said steps of producing said first and second transitions include the step of applying radiant energy to said environment; and
said first and second controlling steps include establishing one or more predetermined photon energies for said radiant energy to selectively excite the particles of said one isotope type at the plural low-lying energy states to said higher energy condition.

3. The process of claim 2 wherein said radiant energy includes one or more laser radiations.

4. The process of claim 1 further including the step of producing a further transition in the particles of said one isotope type excited from the plural low-lying states to a further excited energy condition above the ionization energy level for said particles of said first isotope type.

5. The process of claim 4 further including the step of separating the ionized particles from the remaining particles of said environment.

6. The process of claim 5 further including the step of collecting the separated particles of said one isotope type apart from the other particles of said environment.

7. The process of claim 5 wherein said separating step includes the step of applying a crossed-field to said ionized particles of said isotope type to accelerate said ionized particles to different trajectories.

8. The process of claim 1 further including the step of providing said environment as a vapor flow.

9. The process of claim 8 further including the step of separating the substantially higher energy condition particles of said one isotope type from the remaining components of said environment.

10. The process of claim 9 wherein said separating step includes accelerating the excited particles of said one isotope type to trajectories distinct from their trajectories in the vapor flow.

11. The process of claim 9 wherein said separating step includes the steps of ionizing the excited particles of said one isotope type and accelerating the ionized particles to trajectories distinct from their trajectories in the vapor flow.

12. The process of claim 1 wherein the particles of said first isotope type include the $U_{235}$ isotope of uranium.

13. The process of claim 1 wherein the plural low-lying energy states include the ground energy state and one or more low-lying energy states.

14. In a system for isotope separation, a process for selectively exciting particles of one isotope type in a vapor environment of plural isotope types in which the plural isotope type particles populate plural, low-lying energy states to substantial degrees, said process including the steps of:

applying first radiant energy to said vapor environment to produce selective excitation of the particles of said one isotope type in a first one of the substantially populated, low-lying energy states to a substantially higher level without correspondingly exciting other particles of said environment;

applying second radiant energy to said vapor environment to selectively excite further particles of said first isotope type in one or more further ones of the substantially populated, low-lying energy states to a substantially higher energy level without correspondingly exciting other particles of said vapor environment.

15. The process of claim 14 wherein said one or more further low-lying energy states includes the thermally excited states having significant populations of particles of said one isotope type.

16. The process of claim 15 wherein said thermally excited states include the first one or more thermally excited states directly above the ground state for said particles of said one isotope type, and said first energy state is the ground.

17. The process of claim 14 wherein said first and second radiant energies include one or more laser radiations having isotopically selective photon energies to produce the indicated selective excitation of the particles of said first isotope type from said first and further low-lying energy states.

18. The process of claim 17 wherein said one or more laser radiations include radiant energy from one or more dye lasers.

19. The process of claim 14 further including the step of applying third radiant energy to the particles of said one isotope type in said vapor environment selectively excited from said first and further low-lying energy states to produce ionization of said particles with said third radiant energy.

20. The process of claim 14 wherein said one isotope type is a uranium isotope.

21. In a technique for isotope separation, a process for selectively ionizing particles of one isotope type in a vapor environment of plural isotopes in which the plural isotope type particles populate the ground and one or more other low-lying energy states to a substantial degree, said process including the steps of:

applying first laser radiation to said vapor environment to produce selective excitation of particles of said one isotope type from the ground energy state to an intermediate energy state;

applying one or more further laser radiations to said vapor environment to produce selective excitation of further particles of said one isotope type from the one or more low-lying excited energy states above the ground energy state to an intermediate excited state;

applying further radiant energy to said vapor environment to produce ionization of the particles of said one isotope type excited from the ground and low-lying excited energy states; and separating the ionized particles from said vapor environment by accelerating said ionized particles to predetermined trajectories.

22. In a system for isotope separation, apparatus for selectively exciting particles of one isotope type in an environment of plural isotope types and having substantial isotope populations at plural low-lying energy levels, said apparatus including:

means for producing a first transition in the particles of said first isotope type in said environment;

means for controlling said first transition for selective excitation of said particles of said one isotope type from a first substantially populated low-lying energy state to a substantially higher energy level;

means for producing a second transition in further particles of said one isotope type from one or more other low-lying substantially populated energy states for said one isotope type; and means for controlling said second transition to selectively excite said further particles of said one isotope type from said one or more other low-lying energy states to a substantially higher energy state without corresponding excitation of the other particles of said environment.

23. The apparatus of claim 22 wherein said means for producing said first and second transitions include means for applying radiant energy at one or more predetermined frequencies to said environment.

24. The apparatus of claim 22 further including means for applying said radiant energy in pulses.

25. The apparatus of claim 24 wherein said substantially higher energy states are below ionization and said separating means includes:

means for ionizing the excited particles of said one isotope type whereby the ionized particles are accelerated to predetermined trajectories; and means for applying a magnetic field and a pulsed electric field to said environment.

26. The apparatus of claim 22 further including means for separating the excited particles of said one isotope type from the remaining components of said environment.

27. The apparatus of claim 26 further including means for ionizing the selectively excited particles of said one isotope type.

28. In a system for isotope separation, apparatus for selectively exciting particles of one isotope type in an environment of plural isotope types in which the plural isotope type particles populate the ground and one or more other low-lying energy states to a substantial degree, said apparatus including:

means for applying first radiant energy to said environment to produce selective excitation of said particles of said one isotope type from the ground energy state to a substantially excited energy state; and means for applying a second radiant energy to said environment to produce selective excitation of further particles of said one isotope type from the one or more other populated low-lying excited energy states to a substantially excited energy state.

29. In a system for isotope separation, a process for selectively exciting particles of one isotope type in an environment of plural isotope types, said process including the steps of:

producing a plurality of transitions for said particles of said first isotope type from a plurality of substantially populated low-lying energy levels to create a substantially excited condition for said particles; and Controlling said plurality of transitions to selectively excite said particles of said one isotope type to said excited condition without corresponding excitation of particles of said other isotope type.

* * * * *

United States Patent and Trademark Office

CERTIFICATE OF CORRECTION

PATENT NO. : 4,038,549
DATED : July 26, 1977
INVENTOR(S) : George Sargent Janes et al It is certified that error appears in the above-identified patent and that said Letters Patent are hereby corrected as shown below:

Column 2, line 33, "intermedite" should read --intermediate--.

Column 4, line 11, "intermedite" should read --intermediate--.

Column 6, line 27, "mangetic" should read --magnetic--.

Column 7, line 28, "low-lying states" should read --low-lying energy states--.

Column 8, line 22, after "ground" insert --state--.

Signed and Sealed this

First Day of November 1977

[SEAL]

Attest:

RUTH C. MASON
Attesting Officer

LUTRELLE F. PARKER
Acting Commissioner of Patents and Trademarks